No. 865,201. PATENTED SEPT. 3, 1907.
W. S. MORTON & M. W. KOUNS.
REVERSIBLE TRANSMISSION GEAR.
APPLICATION FILED FEB. 23, 1907.
3 SHEETS—SHEET 3.
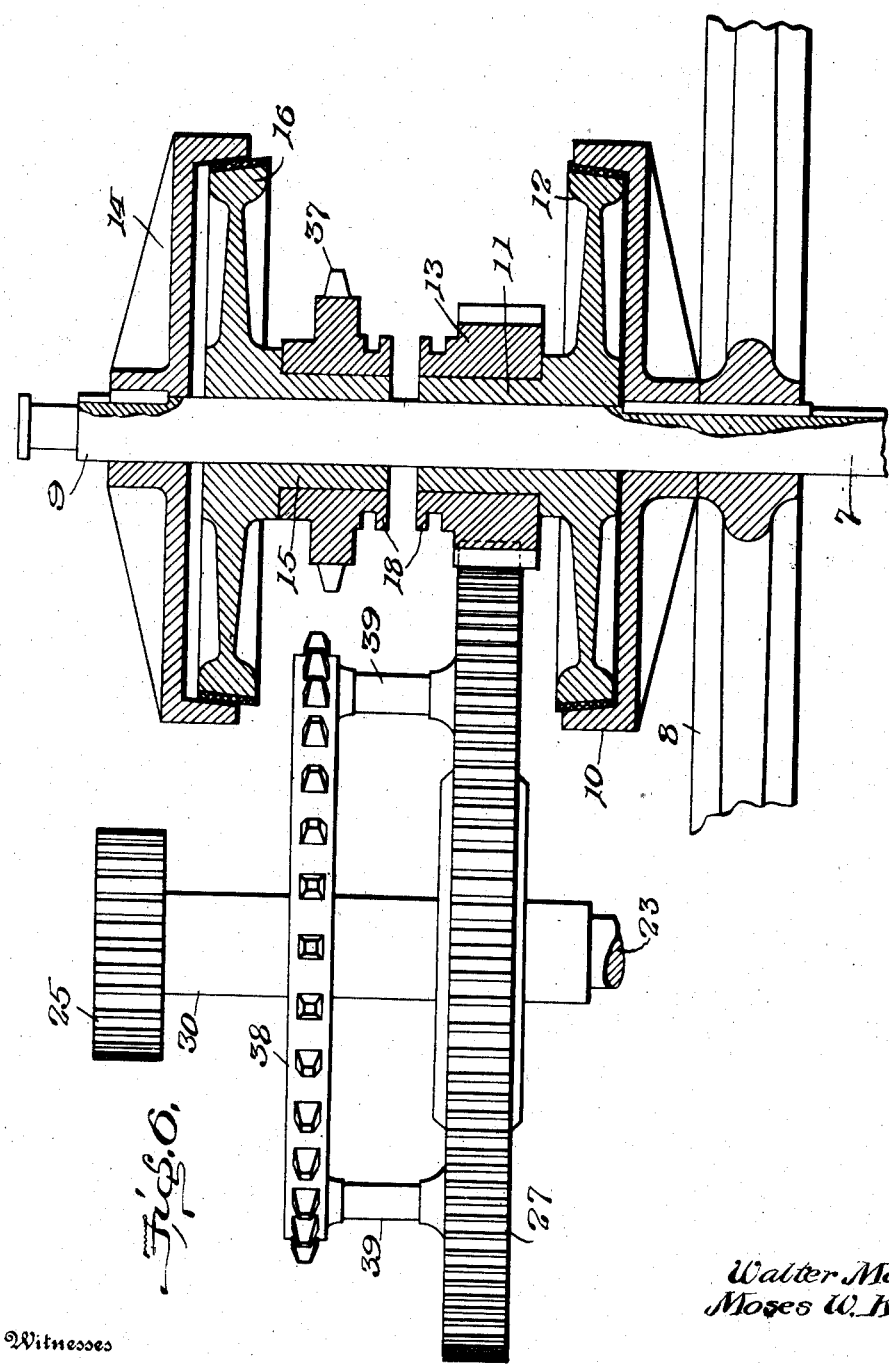

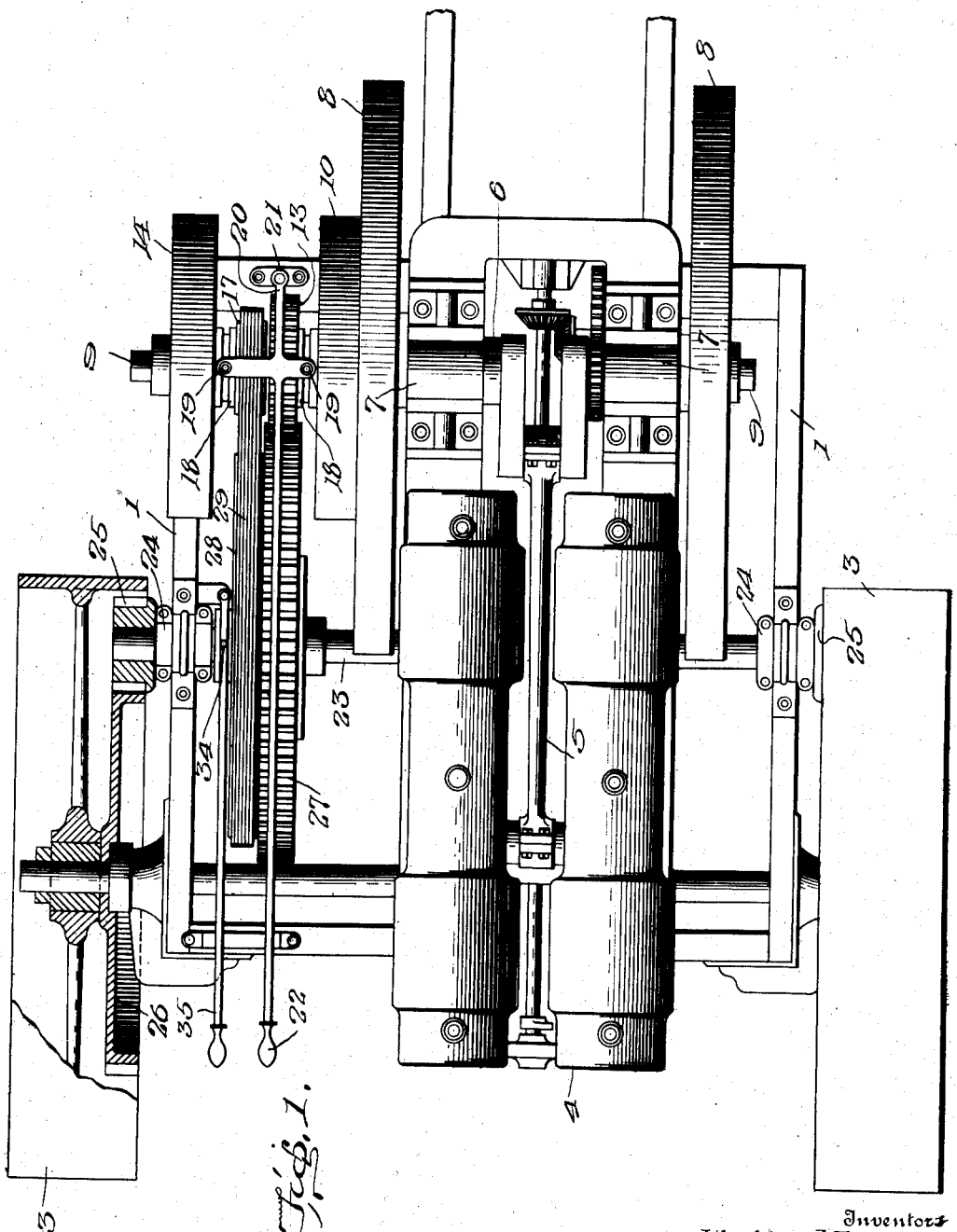

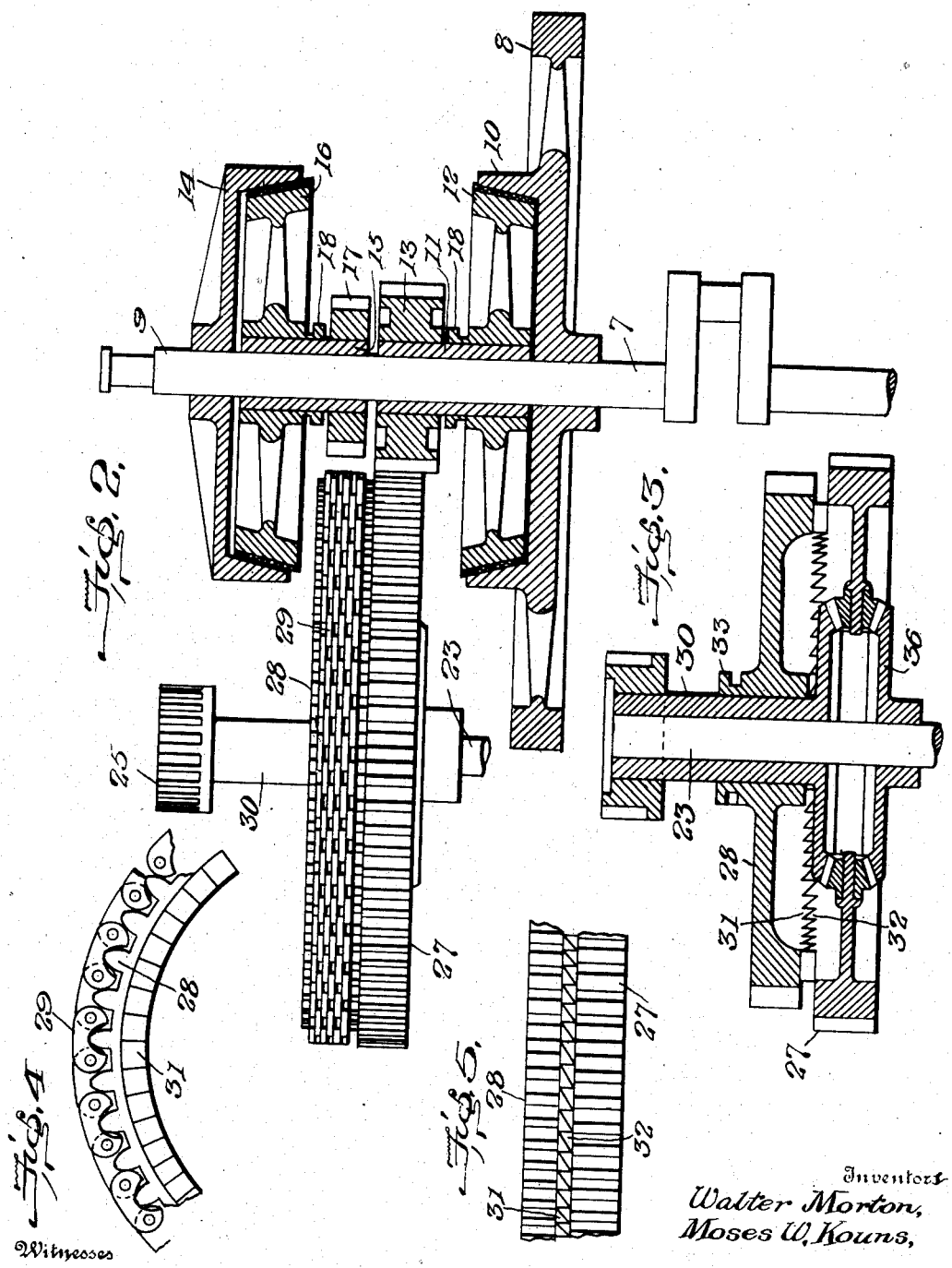

UNITED STATES PATENT OFFICE.

WALTER S. MORTON, OF UPPER SANDUSKY, AND MOSES W. KOUNS, OF COLUMBUS, OHIO, ASSIGNORS TO THE OHIO MANUFACTURING COMPANY, OF UPPER SANDUSKY, OHIO, A CORPORATION OF OHIO.

REVERSIBLE TRANSMISSION-GEAR.

No. 865,201.  Specification of Letters Patent.  Patented Sept. 3, 1907.

Application filed February 23, 1907. Serial No. 358,795.

*To all whom it may concern:*

Be it known that we, WALTER S. MORTON and MOSES W. KOUNS, citizens of the United States, and residents, respectively, of Upper Sandusky, in the county of Wyandot, State of Ohio, and of Columbus, in the county of Franklin, State of Ohio, have invented certain new and useful Improvements in Reversible Transmission-Gears, of which the following is a specification, reference being had to the accompanying drawings.

The present invention relates to reversible transmission gears, and is designed more particularly for use in connection with gasolene traction engines.

The object of the invention is to provide a reversible transmission gear for use in such engines that will be simple in its construction, will occupy a comparatively small space in the engine, will obviate the use of the usual series of intermediate gears, and will impose a minimum strain upon the bearings of the engine when the gear is operated, thus greatly reducing the wear and friction on the working parts.

With these objects in view, the invention consists of certain novel features of construction to be hereinafter described and more clearly pointed out in the claims.

In the accompanying drawings, Figure 1 is a top plan view of a traction engine embodying our invention, showing one of the traction wheels in section. Fig. 2 is a top plan view of the reversing gear partly in section. Fig. 3 is a sectional detail view of a modified form of the same. Figs. 4 and 5 are fractional detail views of the modified form shown in Fig. 3. Fig. 6 is a top plan view of a modified form partly in section.

In these drawings we have illustrated the preferred form of our invention, in which the reference numeral 1 indicates the main frame of a gasolene traction engine having the usual traction wheels 3. The engine cylinders 4 are mounted upon the rear portion of the frame, preferably to one side of the center thereof, and are connected by the connecting rod 5 with the crank shaft 6, which is mounted in suitable bearings 7, on the main frame 1. The crank shaft 6 is provided on the opposite sides of the frame with fly-wheels 8, and extends considerably beyond the fly-wheel on one side of the frame, as shown at 9. The crank-shaft is provided with a clutch member 10 which is rigidly secured to the shaft adjacent to the fly-wheel 8, and is preferably formed integral therewith. A sleeve 11 is loosely mounted on the shaft 7 and is adapted to rotate freely thereon and slide longitudinally thereof. Rigidly secured to one end of the sleeve 11 is the clutch member 12, adapted to coöperate with the clutch member 10, which is rigidly secured to the shaft, and on the opposite end of the sleeve is a pinion 13, which is also rigidly secured thereto The outer end of the shaft 9 is provided with a similar clutch member 14, rigidly secured thereto, and has a similar sleeve 15 loosely mounted thereon and provided with a clutch member 16 and a pinion 17, both rigidly secured to the sleeve; the pinion 17 being slightly smaller both in diameter and width than the pinion 13. The sleeves 11 and 15 are provided with suitable collars 18 adapted to be engaged by the yokes 19, carried by the shifting lever 20, which is pivoted at its forward end to a fixed part of the frame at 21 and extends rearward to the operating platform, where it is provided with a handle 22 for operating the same to shift the sleeves 11 and 15 and to move the clutch members into or out of engagement with each other. The relation of the sleeves 11 and 15 is such that when the clutch member 12 is moved into engagement with the clutch member 10, the clutch member 16 is moved out of engagement with the clutch member 14, and vice versa. The countershaft 23 is journaled in suitable bearings 24 on the frame 1 and is provided at its opposite ends with pinions 25 adapted to mesh with the gears 26 carried by the traction wheels 3. Mounted upon the countershaft 23 in alinement with the pinion 13 is a gear 27, of sufficient diameter to mesh at all times with that pinion and of a slightly less width than the pinion. Carried by the gear 27 is a second gear 28, of slightly less diameter than the gear 27 and arranged in substantial alinement with the pinion 17. The pinion 17 and gear 28 do not come in contact one with the other, but are connected by a suitable driving medium, such as the driving chain shown at 29. Thus it will be seen that when the clutch members 10 and 12 are in engagement, the pinion 13 will rotate the gear 27 and shaft 23 to drive the traction wheels in a forward direction, and when the clutch members 14 and 16 are in engagement, the driving chain 29 extending about the pinion 17 and gear 28 drives the countershaft in the opposite direction, thereby reversing the movement of the traction wheels.

The gear 28 may be secured to the gear 27 in any suitable manner, it being shown as rigidly secured thereto in Fig. 2 of the drawings, while in Fig. 3 we have shown a modified form of the same, in which the gear 28 may be thrown out of engagement with the gear 27 and its movement stopped during the forward movement of that gear, thereby reducing the amount of noise as well as wear and tear on the gear. As constructed in this form, the gear 28 is loosely mounted upon the sleeve 30 of the compensating gear which is carried by the shaft 23 and is provided upon its inner face with a series of teeth 31, adapted to engage and coöperate with the teeth 32 carried on the adjacent face of the gear 27. The gear 28 is also provided with a collar 33, adapted to be engaged by a yoke 34 of a suitable shifting lever 35, whereby the gear may be moved longitudinally of the sleeve 30 to move the teeth into and out of engagement with the teeth of the gear 27.

The gear 27 is provided with the usual compensating gear 36, which forms no part of the present invention, but is mounted upon the shaft 23 in the usual manner; the connection of the gear 28 with the gear 27 being such that the compensating gear 36 mounted in the gear 27 serves to compensate the movement of both the gear 27 and the gear 28.

In Fig. 6 we have illustrated a slightly modified form of the invention, in which we have substituted for the pinion 17 a small sprocket gear 37 and a sprocket wheel 38 for the gear 28, enabling us to employ the ordinary sprocket chain which is cheaper in construction than the driving chain employed in the other form. The sprocket wheel 38 is rigidly secured to the gear 27 by projecting stud shafts 39, which support the same at a suitable distance from said gear and hold the same in a fixed relation thereto.

The operation of the apparatus will be apparent from the foregoing description. In brief it is as follows: Normally the clutch members 10 and 12 are in engagement, and the pinion 13 and gear 27 are rotating the shaft 23 in a forward direction, and the gear 28 is out of engagement with the gear 27 and is idle. When it is desired to reverse the movement of the engine, the gear 28 is moved into engagement with the gear 27 and the clutch members shifted to bring the members 14 and 16 into engagement, thereby permitting the pinion 17, through the medium of its driving chain 29 to rotate the shaft 23 in a rearward direction and reversing the movement of the engine.

We wish it to be understood that we do not desire to be limited to the exact details of construction shown and described, for obvious modifications will occur to a person skilled in the art.

Having fully described our invention, what we claim as new and desire to secure by Letters Patent is:

1. In a device of the character described, the combination, with a shaft and a plurality of gears mounted thereon and adapted to be connected one to the other, of a second shaft, a pinion mounted on said second shaft and adapted to mesh with one of said gears, a second pinion mounted on said second shaft, a flexible driving member adapted to connect said second pinion with another of said gears, and means for connecting said pinions to said shaft.

2. In a device of the character described, the combination with a driving shaft, a plurality of pinions thereon, and clutches adapted to connect said pinions to said shaft, of a driven shaft, a gear carried by said driven shaft, adapted to engage with one of said pinions, and a second gear adapted to be connected to said first mentioned gear, and a flexible driving member adapted to connect said last mentioned gear with another of said pinions, substantially as described.

3. In a device of the character described, the combination with a driving shaft, a plurality of pinions mounted thereon, and clutches adapted to connect said pinions to said shaft, of a driven shaft, a gear mounted on said driven shaft adapted to mesh with one of said pinions, a second gear mounted to slide longitudinally of said driven shaft, means for connecting said second gear with said first mentioned gear, and a flexible driving member for connecting said second gear with another of said pinions, substantially as described.

4. In a device of the character described, the combination with the driving shaft, a plurality of pinions mounted thereon, clutches adapted to connect said pinions to said shaft, of a driven shaft, a gear mounted on said driven shaft having teeth on one face thereof and adapted to mesh with one of said pinions, a second gear mounted to move longitudinally of said driven shaft and provided with teeth adapted to engage with the teeth on said first mentioned gear, and a flexible driving member adapted to connect said second gear with another of said pinions, substantially as described.

5. In a device of the character described, the combination with a driving shaft, oppositely facing clutches carried by said shaft, pinions connected with each of said clutches, one of said pinions being of smaller diameter than the other, of a driven shaft, a gear carried by said driven shaft adapted to mesh with the larger of said pinions, a second gear mounted on said driven shaft of less diameter than said first mentioned gear, and adapted to be connected to said first-mentioned gear and a driving member adapted to connect said last mentioned gear with the smaller of said pinions, substantially as described.

6. A reversible gear comprising a driving shaft, a plurality of pinions mounted thereon, a driven shaft, a gear permanently secured to said driven shaft and meshing with one of said pinions to rotate said driven shaft in a forward direction, a part adapted to be connected to said gear and flexible means for connecting the other pinion to said part to rotate said gear and said driven shaft in a reverse direction.

7. In a device of the character described, the combination, with a driving shaft, and a plurality of pinions mounted thereon, of a driven shaft, a gear mounted thereon, means for connecting said gear to one of said pinions to rotate said driven shaft in one direction, a second gear mounted on said driven shaft, means for connecting said second gear to another of said pinions to rotate said driven shaft in the opposite direction, and means for connecting said gears one to the other, whereby, when said driven shaft is rotated in one direction, said gears move in unison, and when said driven shaft is rotated in the opposite direction, one of said gears remains stationary.

In testimony whereof, we, hereunto affix our signatures in presence of two witnesses.

WALTER S. MORTON.
MOSES W. KOUNS.

Witnesses:
ROBERT E. CARTER,
W. C. HARE.